United States Patent
Thubert et al.

(10) Patent No.: US 9,608,912 B2
(45) Date of Patent: Mar. 28, 2017

(54) COMPUTING DISJOINT PATHS FOR REACTIVE ROUTING MESH NETWORKS

(71) Applicant: Cisco Technology, Inc., San Jose, CA (US)

(72) Inventors: Pascal Thubert, La Colle sur Loup (FR); Jean-Philippe Vasseur, Dunstable, MA (US); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 555 days.

(21) Appl. No.: 14/071,585

(22) Filed: Nov. 4, 2013

(65) Prior Publication Data
US 2014/0068105 A1    Mar. 6, 2014

Related U.S. Application Data

(63) Continuation of application No. 12/044,526, filed on Mar. 7, 2008, now Pat. No. 8,578,054.

(51) Int. Cl.
*H04L 12/803*    (2013.01)
*H04L 12/735*    (2013.01)
(Continued)

(52) U.S. Cl.
CPC .......... *H04L 47/125* (2013.01); *H04L 45/128* (2013.01); *H04L 45/22* (2013.01); *H04L 45/64* (2013.01); *H04W 40/28* (2013.01)

(58) Field of Classification Search
CPC ....... H04L 45/128; H04L 45/22; H04L 45/64; H04L 47/125; H04W 40/28
(Continued)

(56) References Cited

U.S. PATENT DOCUMENTS

| 5,940,771 A | 8/1999 | Gollnick et al. |
| 6,442,171 B1 | 8/2002 | Lee et al. |

(Continued)

OTHER PUBLICATIONS

Marina, On-demand Multipath Distance Vector Routing in Ad Hoc Networks, 2001, retrieved from the Internet <ieee-icnp.org/2001/papers/2001-2.pdf>, pp. 1-10 as printed.

(Continued)

*Primary Examiner* — Abdulkader M Alriyashi
(74) *Attorney, Agent, or Firm* — Polsinelli PC

(57) ABSTRACT

In one embodiment, a reactive routing computer network may be partitioned into diverse logical topologies, and a source node may transmit route request (RREQ) messages toward a destination node on each logical topology. In response, the source node may receive route reply (RREP) messages indicating routes to the destination node in each logical topology. The source node may thus select a route for each logical topology to reach the destination node, accordingly. In another embodiment, if partitioned logical topologies do not produce two or more routes or as a standalone embodiment, the source node may transmit RREQ messages toward the destination node without any corresponding logical topology. The destination node receives RREQ messages, and two or more routes from the source node to the destination node may be determined (e.g., by the destination or source node) based on the received RREQ messages at the destination node and path selection criteria.

20 Claims, 8 Drawing Sheets

(51) Int. Cl.
  *H04L 12/707* (2013.01)
  *H04L 12/715* (2013.01)
  *H04W 40/28* (2009.01)

(58) Field of Classification Search
  USPC ......... 709/238, 239, 240, 241, 243; 370/351
  See application file for complete search history.

(56) References Cited

U.S. PATENT DOCUMENTS

| | | |
|---|---|---|
| 6,618,371 B1 | 9/2003 | Cao |
| 6,751,746 B1 | 6/2004 | Jain et al. |
| 6,765,880 B1 | 7/2004 | Hillard et al. |
| 6,928,484 B1 | 8/2005 | Huai et al. |
| 6,990,075 B2 | 1/2006 | Krishnamurthy et al. |
| 7,113,506 B1 | 9/2006 | Cao |
| 7,161,944 B1 | 1/2007 | Hillard et al. |
| 7,200,104 B2 | 4/2007 | Saleh et al. |
| 7,373,543 B1 | 5/2008 | Jain et al. |
| 7,760,738 B1 | 7/2010 | Chamas et al. |
| 2004/0215822 A1* | 10/2004 | Abe ................ H04L 45/00 709/242 |
| 2005/0111428 A1* | 5/2005 | Orlik .................. H04L 45/02 370/344 |
| 2006/0133299 A1 | 6/2006 | Son et al. |
| 2006/0176847 A1 | 8/2006 | Chen et al. |

OTHER PUBLICATIONS

Huang, A partition network model for ad hoc networks in overlay environments, 2006, retrieved from the Internet <www3.interscience.wiley.com/journal/112731995/abstract?CRETRY=1&SRETRY=0>, pp. 1-15 as printed.

Freedman, Efficient Peer-to-Peer Lookup Based on a Distributed Trie, 2002, retrieved from the Internet <springerlink.com/content/j6mdgc0jtuf0qr90/>, pp. 1-10 as printed.

RFC 3561, Ad hoc On-Demand Distance Vector (AODV) Routing, 2003, retrieved from the Internet <ietf.org/rfc/rfc3561.txt>, pp. 1-38 as printed.

Liang, Multipath "Fresnel Zone" Routing for Wireless Ad Hoc Networks, 2004, retrieved from the Internet <citeseerx.ist.psu.edu/viewdoc/download?doi=10.1.1.58.1350&rep=rep1&type=pdf>, pp. 1-5 as printed.

* cited by examiner

COMPUTING DISJOINT PATHS FOR REACTIVE ROUTING MESH NETWORKS

TECHNICAL FIELD

The present disclosure relates generally to computer networks, and, more particularly, to disjoint paths within reactive routing networks.

BACKGROUND

The ability to compute a set of diverse paths through a computer network (e.g., a mesh network) is an important feature for a wide set of critical applications (e.g., high priority alarms, etc.). For instance, many critical applications rely on "1+1" protection, whereby data is transmitted from a source node to a destination node on both a primary path and a backup path. This technique provides for efficiency in terms of recovery when the data is duplicated on a set of diverse paths (e.g., two or more), and a valid copy is selected by the destination (also referred to as a "single ended protocol"). Notably, diverse paths are not only used for such 1+1 protection, but also for load balancing of traffic across the network, or for primary/backup protection, where the backup path remains un-used until a failure of the primary path.

Although non trivial, various algorithms and techniques currently exist to compute a set of diverse paths while optimizing an objective function on a given network topology. For example, locating diverse paths on a known network topology is a well-known issue with several well-known algorithms (e.g., the known "Bhandari" algorithm to find edge/vertex disjoint paths, such as using modified Dijkstra, Breadth-First-Search, etc.). Such algorithms, however, require knowledge of the network topology, such as a Link State protocol. In mesh networks using reactive routing protocols, such topology is not known, illustratively, since this class of routing protocol is distance vector based. As such, these algorithms cannot be used for reactive routing protocols (e.g., AODV, DYMO, DSR) which flood explorer frames (route requests, or "RREQ" messages) to locate a path to a destination node.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
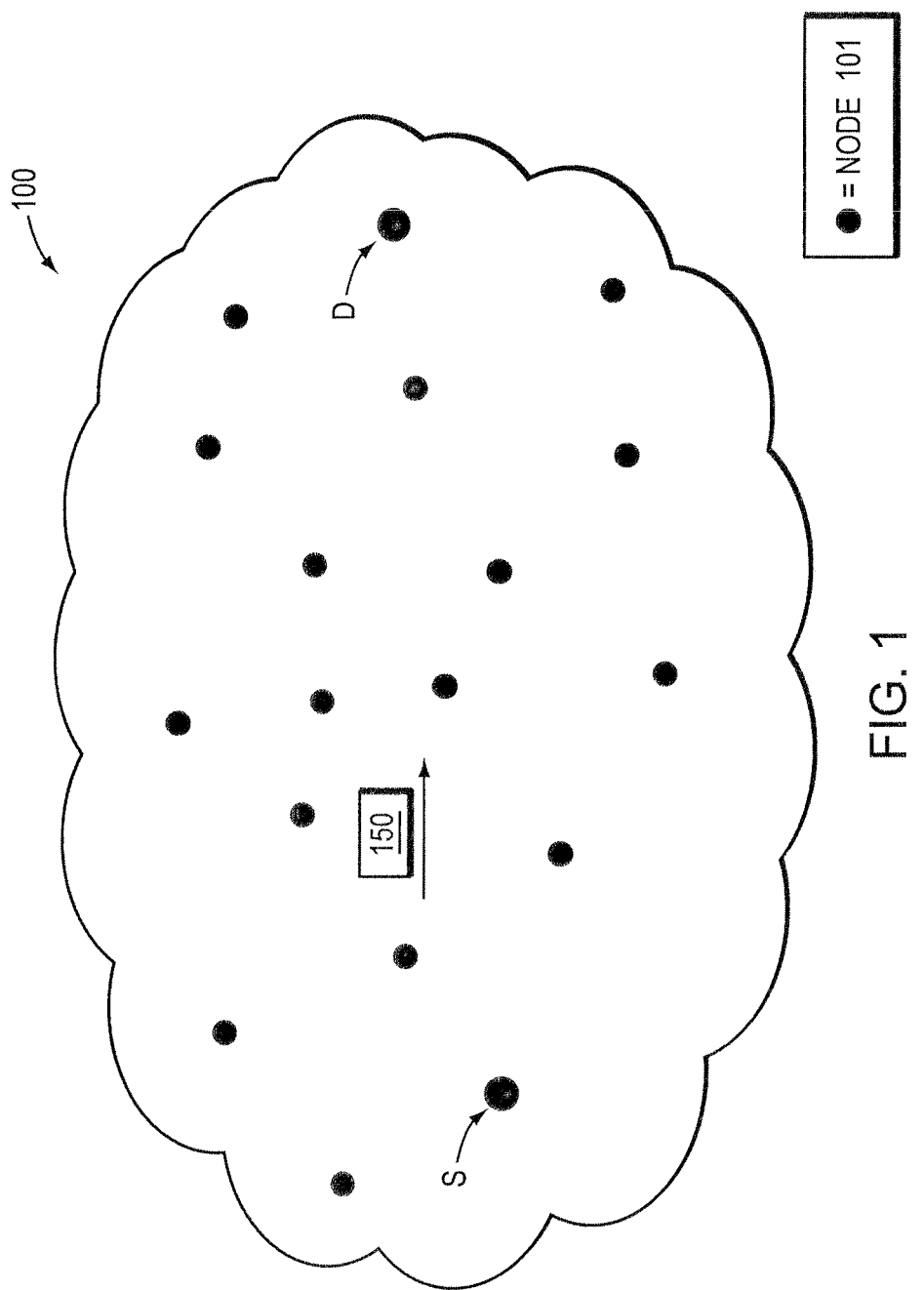
FIG. 1 illustrates an example computer network.

According to embodiments of the disclosure, a reactive routing computer network may be partitioned into two or more diverse logical topologies, and a source node may transmit one or more route request (RREQ) messages toward a destination node on each of the logical topologies, each RREQ message having an indication of a corresponding logical topology and an indication that it should be transmitted all the way to the destination node. In response, the source node may receive one or more route reply (RREP) messages, each indicating a route to reach the destination node using each corresponding logical topology, and the source node may thus select a route for each logical topology to reach the destination node from the source node based on the received RREP message.

Also, according to embodiments of the disclosure, in the event the above embodiment having partitioned logical topologies does not produce two or more routes, or as a standalone embodiment (e.g., having a single logical topology), the source node may transmit one or more RREQ messages toward the destination node, each RREQ message not having any corresponding logical topology. Intermediate nodes record a traversed path of the RREQ message within the RREQ message, and the destination node may receive one or more of the RREQ messages during a configured time period after receiving a first RREQ message at the destination node. Two or more routes from the source node to the destination node may then be determined (e.g., by the destination node or the source node) based on the received RREQ message at the destination node and one or more path selection criteria.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. In addition, a Mobile Ad-Hoc Network (MANET) is a kind of wireless ad-hoc network, which is generally considered a self-configuring network of mobile routes (and associated hosts) connected by wireless links, the union of which form an arbitrary topology. The devices (routers) are free to move randomly and organize themselves arbitrarily; thus the network's wireless topology may change frequently (e.g., rapidly and unpredictably). A MANET may operate in a standalone fashion, or may be connected to a larger WAN (e.g., the Internet). Example MANETs may comprise various sensor networks, or other ad-hoc networks, such as vehicle-to-vehicle routing, person-to-person routing, etc., as may be appreciated by those skilled in the art.

FIG. 1 is a schematic block diagram of an example computer network 100 illustratively comprising nodes/devices 101, such as one or more intermediate nodes and an illustrative source node "S" and destination node "D" interconnected by links (not shown for clarity). Those skilled in the art will understand that any number of nodes, devices, links, etc. may be used in the computer network, and that the view shown herein is for simplicity. The links (not shown) may be a mesh of wired links for electronic and/or optical transmissions, or may comprise a wireless communication medium, as will be appreciated by those skilled in the art (such as for wireless ad-hoc or MANET networks), where certain nodes 101 may be in communication with other nodes 101, e.g., based on distance, signal strength, current operational status, location, etc.

Data packets 150 (e.g., traffic and/or messages sent between the source node and destination node) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), proprietary protocols, etc. In this context, a protocol consists of a set of rules defining how the nodes interact with each other.

Figure 2:
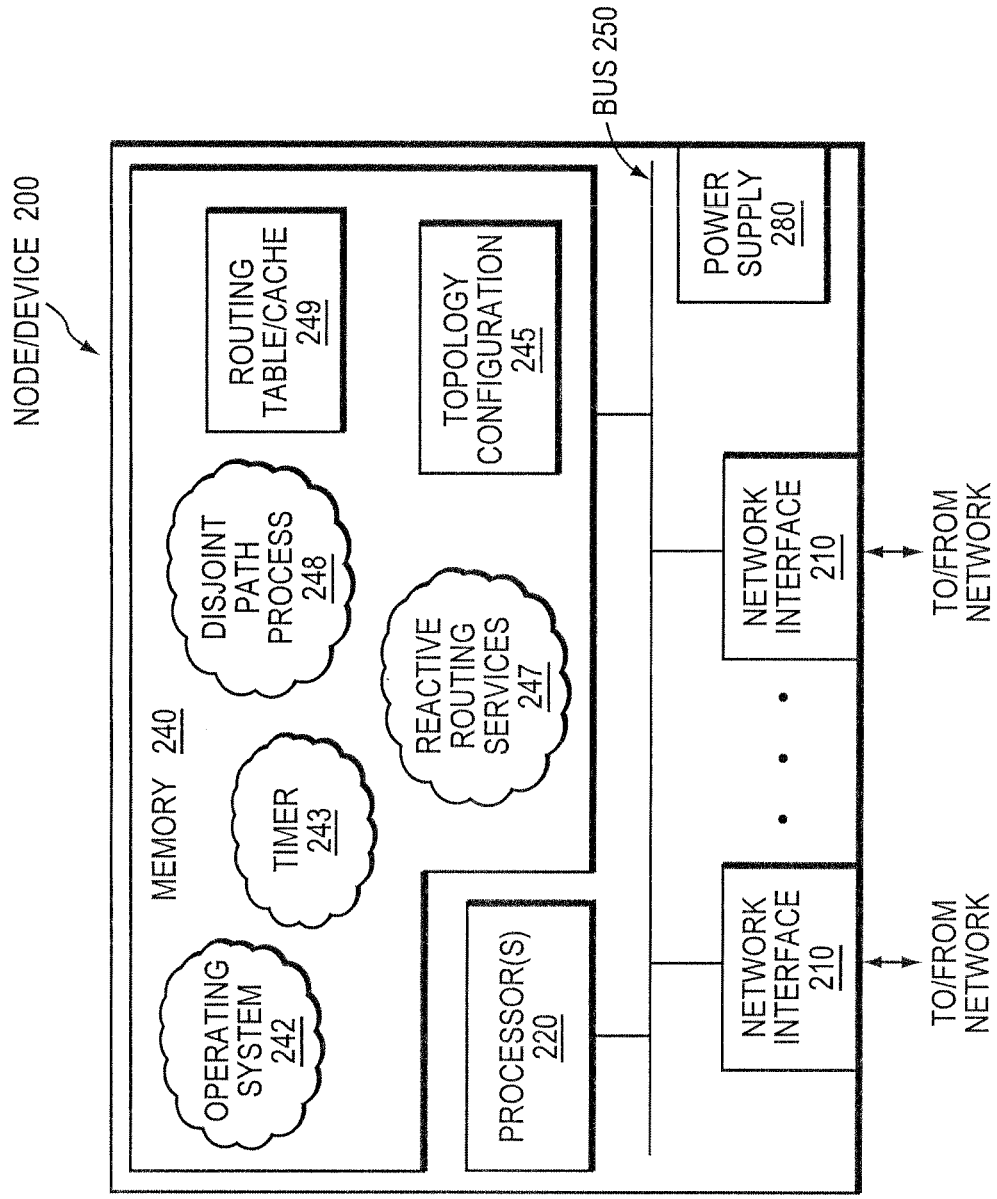
FIG. 2 illustrates an example network device/node.

FIG. 2 is a schematic block diagram of an example node/device 200 that may be advantageously used with one or more embodiments described herein, e.g., as a node 101 of network 100. The device comprises a plurality of network interfaces 210, one or more processors 220, and a memory 240 interconnected by a system bus 250. (Also, power supply 280 may be embodied as a mobile supply, e.g., a battery, a wired/constant supply, e.g., a standard plug, etc.) The network interfaces 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor(s) 220 and the network interfaces 210 for storing software programs and data structures associated with the embodiments described herein. The processors 220 may comprise necessary elements or logic adapted to execute the software programs and manipulate the data structures, such as a routing table/cache 249, and a topology configuration 245 (as described herein). An operating system 242, portions of which are typically resident in memory 240 and executed by the processor(s), functionally organizes the node by, inter alia, invoking network operations in support of software processes and/or services executing on the device. These software processes and/or services may comprise routing services 247, disjoint path process 248, and a timer 243. It will be apparent to those skilled in the art that other processor and memory types, including various computer-readable media, may be used to store and execute program instructions pertaining to the inventive technique described herein.

Routing services 247 contain computer executable instructions executed by each processor 220 to perform functions provided by one or more routing protocols, such as reactive routing protocols (and, e.g., may thus be referred to as "reactive routing services" 247) as will be understood by those skilled in the art. These functions may be configured to manage a routing table/cache 249 containing, e.g., data used to make routing decisions. In particular, as opposed to proactive routing, where connectivity is discovered and known prior to computing routes to any destination in the network (e.g., Optimized Link State Routing, "OLSR"), reactive routing (or ad-hoc routing) discovers neighbors (i.e., does not have an a priori knowledge of network topology), and in response to a needed route to a destination, sends a route request into the network to determine which neighboring node may be used to reach the desired destination. Illustrative reactive routing protocols may comprise, inter alia, Ad-hoc On-demand Distance Vector (AODV), Dynamic Source Routing (DSR), DYnamic MANET On-demand Routing (DYMO), etc. Generally, reactive routing protocols may be used to reduce storage and processing requirements on the nodes 101 (e.g., small, distributed, low-power devices, such as sensors), and to limit the number of updates to stored topologies due to the ad-hoc changing nature of the network (e.g., MANETs).

For example, AODV is a reactive routing protocol (establishes a route to a destination only on demand) that is a distance-vector routing protocol (and uses sequence numbers on route updates to avoid various known problems with distance-vector protocols). In AODV, the network is silent until a connection is needed to transmit data packets to a destination, at which time the node requiring a connection broadcasts a request for connection (a route request, or "RREQ" message). Other nodes forward this request, recording the node from which the request was received, until the destination is reached, or until a node is reached that has a previously learned route to the destination. At that time, a reply (a route reply, or "RREP" message) is returned to the requesting source node backwards along the recorded route, and the requesting node (and any intermediate node) thus learns a route (i.e., the next hop node) to the destination, and stores this information (the next-hop node) in routing table 249. (Notably, a plurality of routes is often learned, and the requesting node is configured to select a "best" route, such as based on a hop count, cost, etc.). When a link in the network fails, a routing error is passed back to a transmitting node, and the process to learn a route to the destination repeats. Sequence numbers may be used to determine a most recently route, as ad-hoc networks tend to change topology often.

DSR, on the other hand, is another reactive routing protocol that is similar to AODV, however, DSR uses source routing instead of relying on the routing table at each intermediate device. A similar technique using route requests and replies are again used, but now the source node includes the entire path within data packets sent to the destination. In this manner, the intermediate nodes need not store (or update) information in routing tables. Note that each intermediate node may still cache the entire path to the destination (in routing cache 249), which may be used to reply to a route request quickly, as the intermediate node is aware (at least temporarily) of a path to the requested destination.

In addition, DYMO is a successor to AODV, which shares many of AODV's benefits, but which may be more efficient to implement. DYMO may be a proactive routing protocol and/or a reactive routing protocol. Similarly to AODV (and DSR), DYMO discovers routes as they are needed through two steps:

1. A "Route Request" (RREQ) message is broadcast through the MANET. Each RREQ message maintains an ordered list of all nodes it has passed through, so every node receiving an RREQ message can record a route back to the origin of this message; and
2. When an RREQ message arrives at its destination (or a node aware of a route to the destination), a "Routing Reply" (RREP) message is returned back to the origin, indicating that a route to the destination was found. On its way back to the source, an RREP message can simply backtrack the path of the RREQ message and may allow all nodes through which it passes to record a complementary route back to where it came from. Once the RREP message reaches its destination (i.e., the requesting source node), a two-way route has been successfully recorded by all intermediate nodes, and the exchange of data packets (traffic 150) may begin.

In other words, regardless of the specific protocol used for reactive routing (AODV, DSR, DYMO), a similar technique may be used to obtain routes to a particular destination, whether that route is stored locally on the intermediate nodes 101 or is transmitted with the data packet 150. Specifically, the use of general "route request" messages and "route reply" messages may be used, accordingly, to obtain the desired paths through the network 100.

Figure 3:
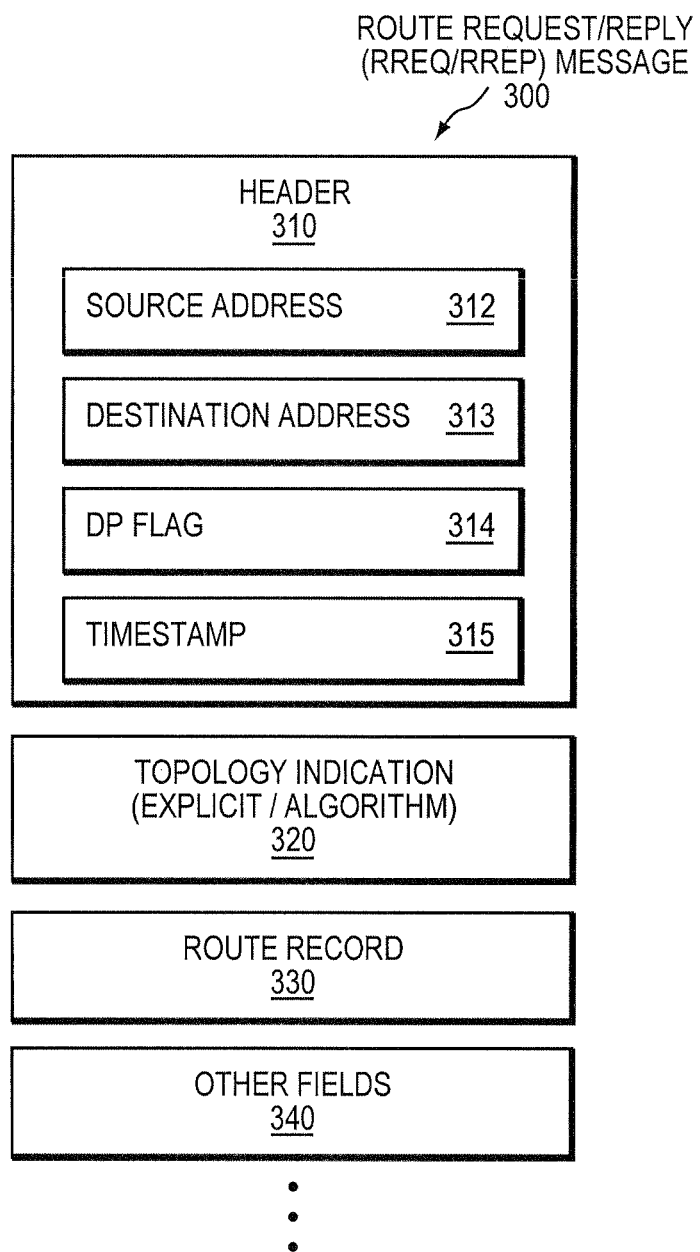
FIG. 3 illustrates an example message format.

FIG. 3 illustrates an example route request (RREQ) (or "explorer" message) or route reply (RREP) message 300 that may be transmitted by nodes 101 of the reactive routing network 100. Illustratively, the message 300 is a generic message, and those skilled in the art will understand that other messages may comprise other fields accordingly (e.g., specific fields for an RREQ message as opposed to an RREP message, etc.). The message 300 includes a header 310, a novel topology indication field 320 (described below), a route recording field 330, and any other applicable fields 340 (e.g., source sequence number, destination sequence number, broadcast identifier, the time-to-live or "TTL" fields, etc.). A source address (identifier) 312 and destination address (identifier) 313 within the header 310 may be network addresses for the requesting/source (node S) and destination device (node D), respectively. Also, as described herein, a "disjoint path" or "DP" flag/field 314 and a timestamp field 315 may also be contained within the header 310. (Notably, objects illustratively shown in header 310 may be separate objects/fields within the message 300, and are merely shown in the header for illustration.) Route record field 330 may be used in accordance with various reactive routing protocols, for instance, being populated by intermediate nodes during RREQ message transmission, and used for back-tracking during RREP message return. In particular, within route record field 330, a listing of traversed nodes may be maintained for a corresponding path/route taken by the message 300 between the source node and destination node (or visa versa in reverse), as may be understood by those skilled in the art. For instance, upon receiving an RREP message, a node may store an entry listing a "downstream" (toward the destination) node from which the message is received, such that upon receiving traffic for the destination of the message, the node will know which downstream node may be used to reach the destination, accordingly. Further description of the use of messages 300 may be found with reference to the examples described below in FIGS. 4A-4C.

As noted, the ability to compute a set of diverse paths through a computer network (e.g., a mesh network 100) can be an important feature (e.g., for critical applications), such as for 1+1 protection, load balancing, or primary/backup protection. Current algorithms and techniques to compute diverse paths are directed toward locating diverse paths on a known network topology, such as for link state protocols (e.g., Optimized Link State Routing, OLSR). In mesh networks using reactive routing protocols, however, such topology is not known, and as such, these algorithms cannot be used for reactive routing protocols (e.g., AODV, DYMO, DSR) which flood explorer frames (RREQ messages 300) to locate a path to a destination node.

Alternatively, a known two-step approach which may be used for reactive routing networks (as well as proactive routing networks) involves computing a first path from the source to the destination, and then computing a second path while avoiding hops traversed by the first path. Unfortunately, this two-step technique cannot guarantee the location of a set of diverse paths, even if a set exists (e.g., a "trapping" problem, where the first path precludes locating diverse paths that would exist otherwise had a different first path been computed). Further, selection of the set of diverse paths in this two-step approach does not allow for specific objective functions to be met, such as, e.g. trying to minimize the sum of the costs of the two paths, trying to minimize the difference in path costs to avoid jitter when switching from the primary to the backup path, etc.

Computing Disjoint Paths for Reactive Routing Networks

According to one or more embodiments of the disclosure, a reactive routing computer network may be partitioned into diverse logical topologies, and a source node may transmit route request (RREQ) messages toward a destination node on each logical topology. In response, the source node may receive route reply (RREP) messages indicating routes to the destination node in each logical topology. The source node may thus select a route for each logical topology to reach the destination node, accordingly. Also, according to one or more other embodiments, if partitioned logical topologies do not produce two or more routes or as a standalone embodiment, the source node may transmit RREQ messages toward the destination node without any corresponding logical topology. The destination node receives RREQ messages, and two or more routes from the source node to the destination node may be determined (e.g., by the destination or source node) based on the received RREQ messages at the destination node and path selection criteria.

Illustratively, disjoint path process/services 248 (in conjunction with reactive routing services 247) contain computer executable instructions executed by each processor 220 to perform functions related to computing disjoint paths through reactive routing networks as described in accordance with one or more embodiments described herein. For instance, the process 248 may be used to compute diverse paths in a reactive MANET, e.g., to enable load balancing with high reliability (that is, little or no traffic impact from a single path failure). In addition, signaling extensions (e.g., to RREQ messages) may be used by the disjoint path process 248 as described herein to specify whether diverse paths are required during path discovery.

Operationally, according to one or more embodiments described herein, a reactive routing computer network 100 may be logically partitioned into two or more diverse logical topologies. In particular, considering that a mesh network (such as a sensor network) is typically very dense, it is expected to generally be able to partition the network into multiple congruent topologies. In this manner, a source node may be able to reach a destination via routes in each (or at least two or more) logical topology(ies), thus providing a plurality of diverse paths/routes.

To partition the network, various techniques may be used. For instance, an offline server can run an algorithm that associates the nodes to topologies without computing any routes (completed reactively later). For example, the network may be logically partitioned prior to transmitting RREQ messages (described below), and the topologies may be configured/stored on the nodes, e.g., in topology configuration field 245 of memory 240, and used later in response to indications in the RREQ messages. (In other words, each node in the network 100 may be configured to use the same algorithm to determine logical topologies.) Alternatively (or in addition), a source node S interested in learning diverse routes to destination node D may determine a partitioning scheme to allow for well-distributed nodes in a number of topologies to reach the destination node. If the source node selects the partitioning of logical topologies, then the partitioning algorithm used may be transmitted within RREQ messages (e.g., field 320) to be processed/interpreted by the receiving intermediate nodes of the network as described herein.

Example partitioning algorithms may comprise simple algorithms, such as whether an address (e.g., a media access control, or "MAC" address) of the node contains a "1" or "0" at a particular bit position of the address (e.g., the last/terminating bit, making for "even" and "odd" topologies as used herein). Also, more complex algorithms, such as hashing algorithms that define nodes as corresponding to one logical topology or another, may also be used. For instance, assume that some number "N" routes is to be built (e.g., N=3). Accordingly, a hash modulo N may be selected as the partitioning algorithm and applied to the nodes (e.g., to the addresses) to define/classify the nodes into a particular logical topology, accordingly. Other partitioning algorithms may be used, and those mentioned briefly herein are merely representative examples.

Figure 4A:
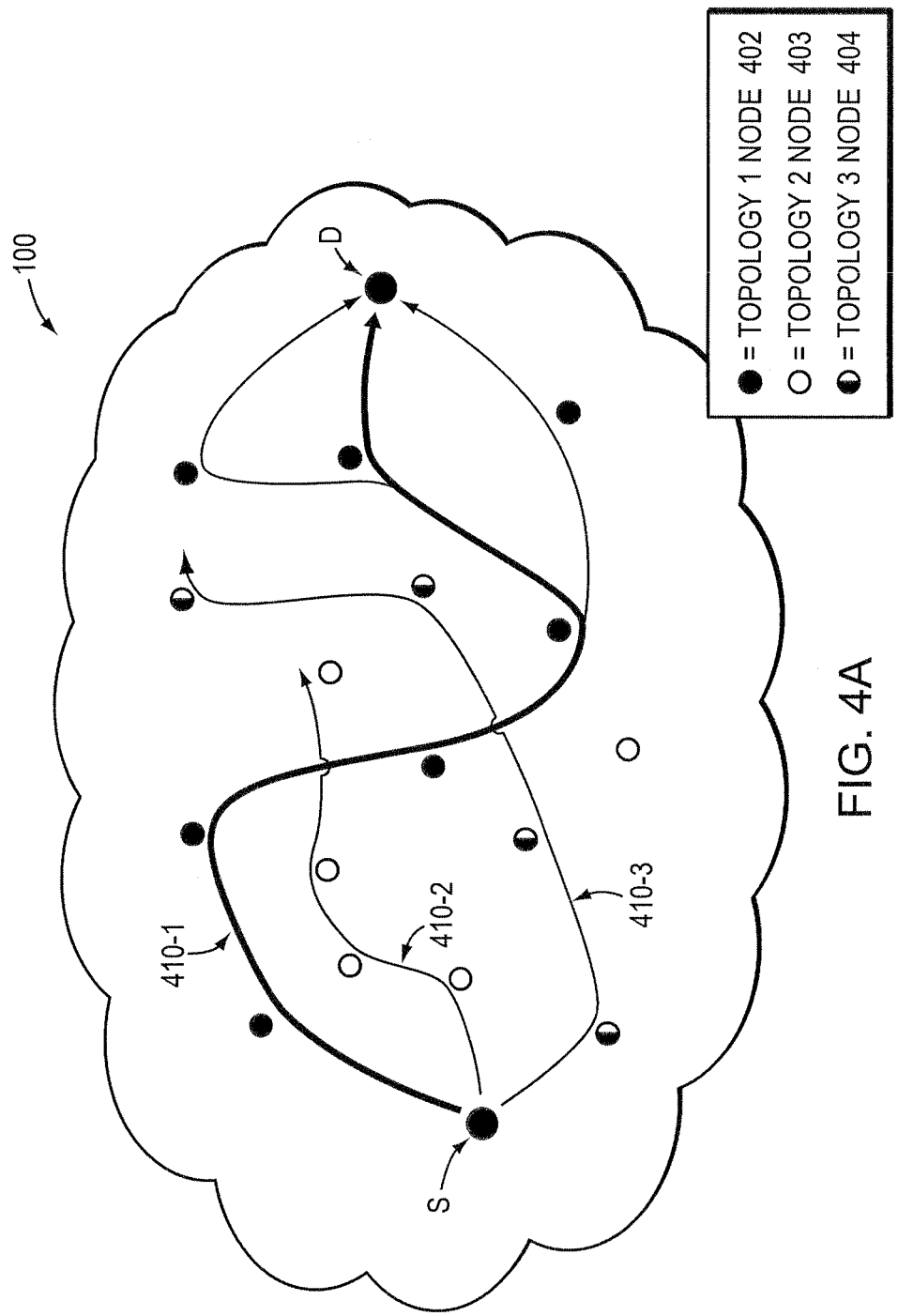
FIGS. 4A-C illustrate the example computer network of FIG. 1 in accordance with techniques described herein.
Figure 4B:
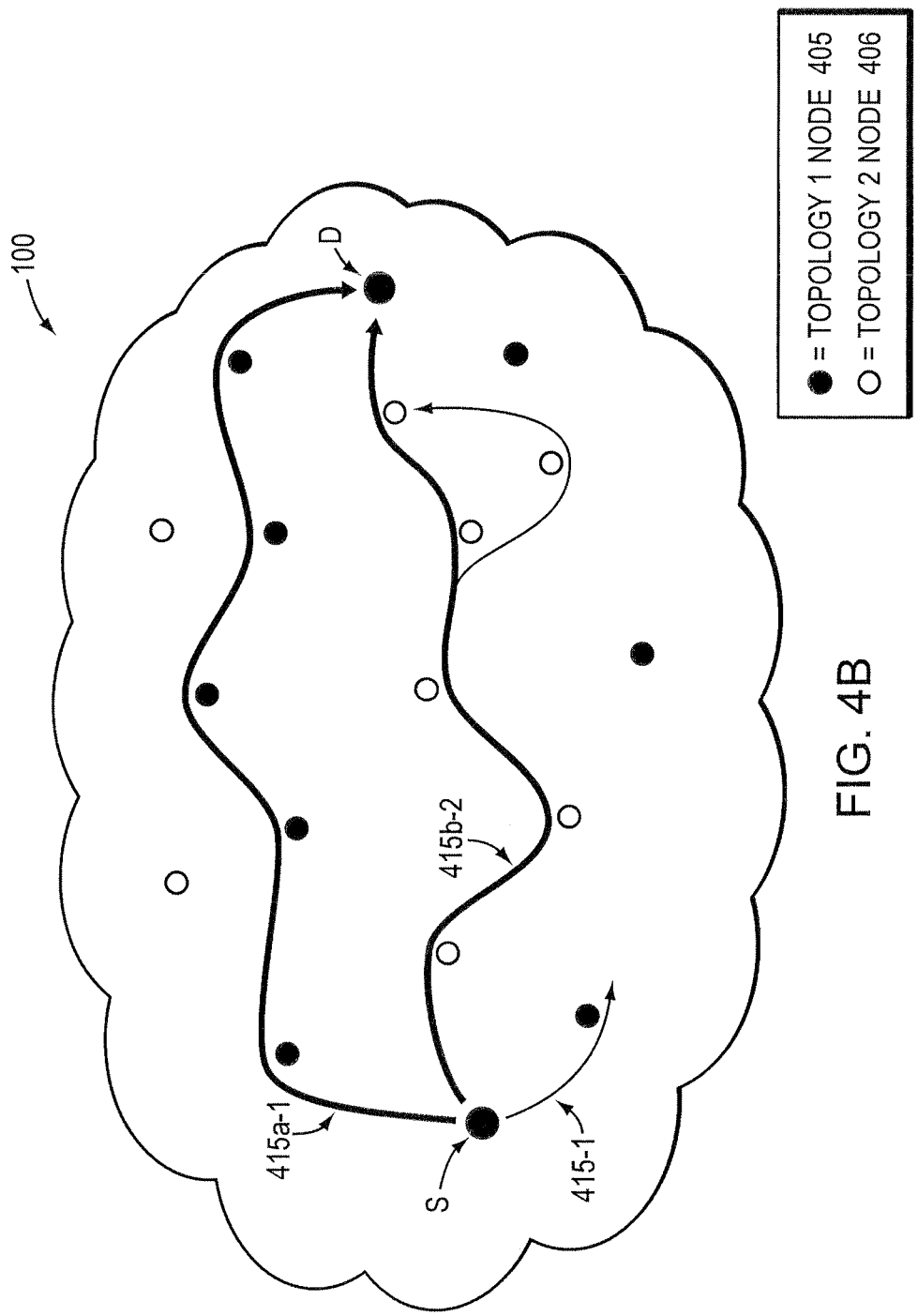
Figure 4C:
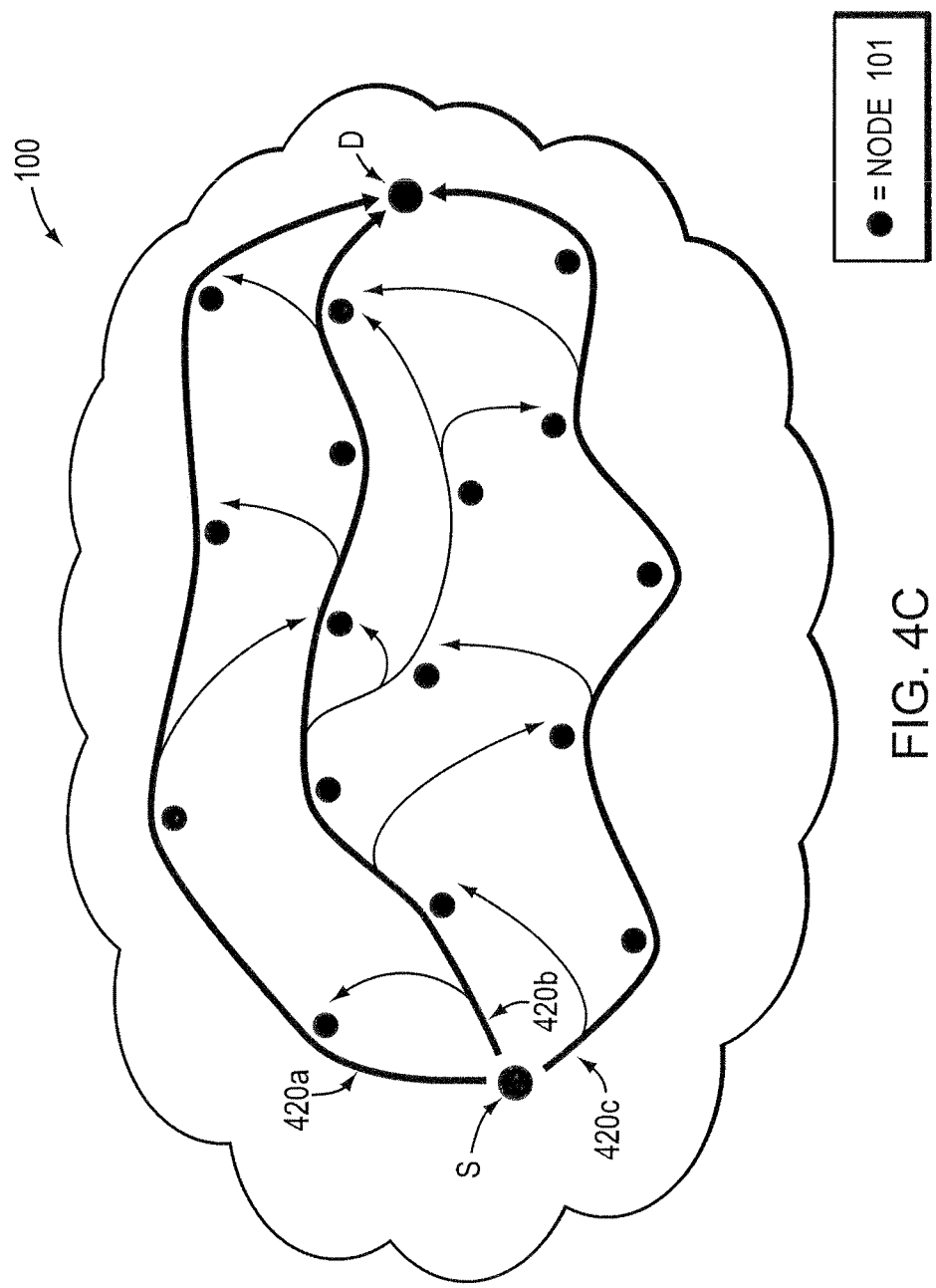

Another way of looking at the partitioning techniques is that each node may "painted" a different "color" based on the topology configuration of the node (e.g., stored in 245 or determined by the partitioning algorithm), thus each color corresponds to a particular topology. The source node may then send out RREQ messages corresponding to a particular color (indicated in field 320), resulting in non-overlapping (diverse/disjoint) topologies. For example, FIGS. 4A-4C illustrate differently partitioned networks 100, resulting in differently delineated logical topologies. For instance, FIG. 4A illustrates an arrangement of three logical topologies (solid nodes 402, outlined nodes 403, and half-solid, half-outlined nodes 404), selected in a manner consistent with an algorithm defined above that results in three topologies (e.g., some hashing function that results in three possible outcomes). Also, FIG. 4B illustrates two logical topologies (solid nodes 405 and outlined nodes 406), such as in accordance with another partitioning algorithm defined above (e.g., even/odd topologies). (FIG. 4C is described further below.)

Notably, one or more nodes of the network may be configured to correspond to a plurality of logical topologies. For instance, in certain networks, it may be beneficial to include particular nodes within multiple topologies, e.g., where inclusion of those nodes/devices in multiple topologies is acceptable. For example, in a network of battery operated nodes, one or more other nodes of the network may be non-battery powered nodes (e.g., receiving power from a constant power supply). Also, one or more nodes may be otherwise more suitable for overlap, such as large, high power devices that may be considered a low risk of problematic sharing/intersection (e.g., stationary devices, devices less prone to failure, etc.). In this case, although the paths may not be fully diverse they provide an acceptable risk fate sharing. Further, some nodes may be considered necessary to provide routes between particular sources and particular destinations, such as high access hubs/routers, service devices, etc., and locating diverse paths that do not include those devices may be difficult or impossible. (Note that it may still be beneficial to locate diverse paths on either side of the overlapping device, that is, diverse paths with the exception of the shared device.) As an illustrative example, assume (for this illustration only) that FIG. 4A shows two topologies (e.g., solid/even and outlined/odd), and then certain nodes 404 within the network 100 correspond to both topologies (that is, whether the node itself would correspond to a particular topology, e.g., even or odd, the half-and-half nodes are configured to belong to either topology, accordingly).

Once the partitioning has been configured, the source node S may transmit one or more RREQ messages 300 toward a destination node D on each of the logical topologies. For instance, assume as in FIG. 4B that the partition results in two logical topologies (nodes 405 or 406), such as odd/even addresses. The RREQ messages 300 may be sent in parallel on each topology, where a tag in the RREQ message indicates a corresponding logical topology (field 320). As noted, the indication may be as simple as a "1" or "0" to indicate whether even or odd intermediate nodes should respond/process the message (where the nodes are configured to interpret field 320 accordingly). Alternatively, the indication may contain the algorithm used to determine the topology of each node, e.g., a particular hash to be applied by each intermediate node (e.g., to its address) to determine whether to respond to/process the message. In this manner, the indication ("tag") in the RREQ message limits the possibilities to forward the message to the topology indicated by the tag, and the possibilities can be mutually exclusive. As such, the tagged RREQ messages (explorers) build routes sharing no common hop (i.e., diverse topologies with non-overlapping nodes result in diverse/disjoint paths/routes).

Also, as opposed to having intermediate nodes return an RREP message if a route to the destination is known, the embodiments described herein include an indication within the RREP message that the message should be transmitted all the way to the destination node D. In other words, all RREQ messages are "forced" to reach the destination node, even if a node en-route already has a corresponding route stored/cached (table/cache 248) to the destination node. This behavior may be specifically triggered for the RREQ messages 300 having the DP flag 314 set. (Note that this may also be done in DYMO by not including a "TargetNode.SeqNum," as may be appreciated by those skilled in the art.)

Each intermediate node that receives the RREQ message 300 processes the message based on the indication of the corresponding logical topology. For instance, if the message 300 contains an explicit topology indication 320 (e.g., even or odd), then the receiving intermediate node may determine whether its topology corresponds to the message (e.g., whether the node is an even or odd node) based on a topology configuration value 245 of the node. On the other hand, if the topology field 320 of message 300 contains an algorithm to be used (e.g., a hash), then the node processes the algorithm to determine its topology, and decide whether the topology corresponds to the node. If the topology does not correspond, the intermediate node may discard the RREQ message (e.g., in the case of broadcast media, the message may be filtered by the receiver). If, however, the topology does correspond, then the intermediate node may handle the RREQ message in a conventional manner as described above (that is, processing RREQ messages, generally) to record the route in field 330, and forward the request to the intermediate node's neighbors. (Note that the full path may be made available in the RREQ message 300 naturally in source route protocols such as DSR, and can be ensured in stateful reactive protocols such as DYMO by adding Additional Routing Information in field 340 of the messages.) Moreover, the intermediate node may determine to which downstream nodes to send an RREQ message 300 based on whether the downstream nodes belong to a particular logical topology corresponding to the RREQ message, assuming the intermediate node is aware of (or can determine) the downstream nodes' topology, accordingly.

The destination node D receives one or more RREQ messages 300 for each topology (assuming any paths exist), and consequently returns a selected path in an RREP message 300 for each topology (e.g., one for even and one for odd). That is, because the topologies are known to be diverse, the destination node may simply select a best (e.g., shortest) route for each logical topology to reach the destination node D from the source node based on the received RREQ messages 300. As mentioned above, the RREP messages 300 are propagated back to the source node.

The source node S may subsequently receive any returned RREP messages 300 that each indicate a route to reach the destination node D using each corresponding logical topology. In particular, assuming the example given above (FIG. 4B), a route for each topology (assuming any exist) may be returned to the source node, and the source node may select the routes for each logical topology to reach the destination node D. The source node S may then transmit traffic (data packets 150) onto one or more of the diverse selected paths in each topology (for instance, according to source based routing, or next-hop stored routing, as described above with reference to reactive routing services 247).

Notably, there may be instances where the initial (initialized) logical partitioning of the network may not result in two or more diverse routes from the source node S to the destination node D. For instance, if the network is too partitioned, there may be insufficient nodes 101 of a particular topology to reach the destination. For instance, assume that the network is partitioned as in FIG. 4A (with three separate topologies). It will be readily apparent that based on the logical topologies (nodes 402, 403, and 404), the distribution of the nodes may limit topologies corresponding to nodes 403 and 404 from producing a route to the destination node D (e.g., node D is only in communication with nodes 402), as shown by incomplete paths 410-2 and 410-3. Topology 1, and its associated path 410-1 (bold line), however, has been competed, but is only a single path (thin lines and arrows demonstrate an illustrative path followed RREQ messages 300, but terminated due to duplicate message reception or no further reachable nodes).

In response, the source node may re-partition the network, such as from a comparatively larger number of diverse logical topologies to a comparatively smaller number of topologies. For example, from three topologies in FIG. 4A, the source node may repartition the network into two logical topologies as in FIG. 4B, as described above. Accordingly, two diverse paths 415a-1 and 415b-2 may be located from the source node to the destination node (note that diverse paths may "cross" each other in the illustration, but no overlapping nodes or links need be utilized). There may be circumstances, however, where the lowest number of partitions (e.g., one partition, two logical topologies) does not result in diverse paths. In this instance, no partitions may be used, resulting in a single (logical or actual) topology.

According to embodiments of the disclosure, in the event the above embodiment having partitioned logical topologies does not produce two or more routes, or as a stand-alone embodiment (e.g., having a single logical topology without first having attempted partitioning the network), an adjusted technique may be used to determine/locate a plurality of diverse/disjoint paths between the source node S and destination node D in a reactive routing computer network 100. For example, FIG. 4C illustrates a non-partitioned network, where all nodes 101 correspond to the same topology. As described above, the source node S may transmit one or more RREQ messages 300 toward the destination node D, again with an indication that each should be transmitted all the way to the destination node (e.g., DP flag 314). However, here there need not be any indication of a particular topology 320, as there is only one topology to be considered (that is, any node 101 may be used). Also as described above, each intermediate node 101 processes the RREQ message 300, e.g., by recording the traversed paths (420-1, 420-2, 420-3) of the RREQ message within the RREQ message (field 330).

Upon receiving a first RREQ message 300, the destination node D may initiate a timer (timer 243), the duration of which illustratively depends upon the time taken by the RREQ message 300 to reach the destination node. This time taken may be measured based on measured latencies, transmission delays, or other time synchronization protocols (e.g., network time protocol, "NTP"), and carried within the message 300 in timestamp field 340. The configured time period/duration for which the destination node waits may be evaluated based on the type of network, the number of hops in the route (recorded in field 330), etc., and is used to allow additional RREQ messages 300 to arrive, but with a set deadline. When the timer elapses, the destination node considers the set of RREQ messages received from that source node, and depending upon network configuration, may examine them to find a set of diverse paths, or may return the received RREQ messages to the source node so that it may examine the paths.

More specifically, if so configured, the destination node may determine two or more diverse routes from the source node S to the destination node D based on the received RREQ messages 300 and one or more path selection criteria. The destination node may then send an RREP message 300 for each of the selected routes to the source node (that is, two or more corresponding RREP messages 300). Alternatively, if so configured, the destination node may return a single RREP message (or other specific type of message or messages) to the source node with a field 340 that may be populated with the two or more selected paths. In this case, the source node itself may determine the two or more routes based on the RREQ messages of the RREP message.

Each of either the destination node D or source node S may determine the routes based on various path selection criteria as configured. For example, in addition to the number of diverse paths/routes to select (e.g., generally two), other path selection criteria may include, inter alia, a degree of diversity between paths (e.g., the least overlapping segments of the paths), a degree of intersection (e.g., a least number of intersecting nodes), a cost ratio (e.g., between the shortest path and the acceptable paths from which to choose), a sum of costs (e.g., a minimum sum of the primary and secondary path), a selection of preferred nodes (e.g., non-battery operated), and an exclusion of non-preferred nodes (e.g., unreliable nodes), etc.

In this manner, if there are diverse paths to be located in the network 100, the complete search (single topology) technique will find the paths, and will be able to select a "best" set of the paths based on one or more selection criteria. At the same time, however, the complete search results in flooding the network with RREQ messages 300, which may be an overburdening task for the entire network. Contrarily, the "limited" search described above with partitioned logical topologies results in lower flooding/propagation of RREQ messages 300, and the routes determined using this search are simple and deterministic (that is, paths from diverse topologies are diverse). At the same time, however, the limited search may not locate diverse paths if the topology is partitioned in a manner that less than two topologies produce paths to the destination node. Accordingly, as mentioned above, the source node may utilize both techniques, e.g., sequentially, as opposed to simply one or the other technique. For example, the limited search may be used, e.g., with greater numbers of partitions decreasing to smaller numbers of partitions, and if unsuccessful, the complete search (single topology) technique may be used. (Note that the chosen technique may be determined on a per-destination node basis, or may be statically configured on the source node.)

Figure 5:
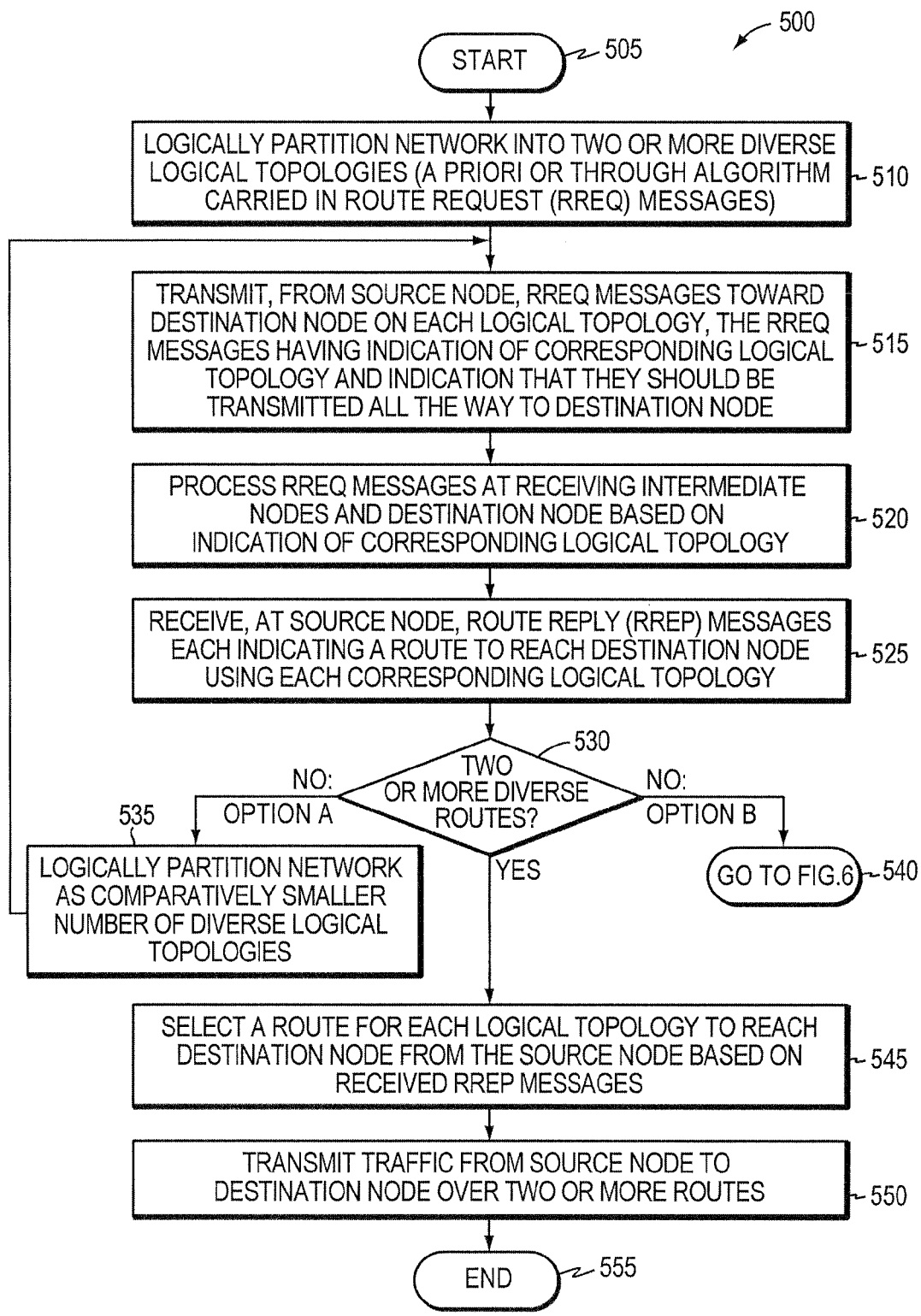
FIGS. 5 and 6 illustrate example procedures for computing disjoint paths in a reactive routing computer network.

FIG. 5 illustrates an example procedure for computing disjoint paths in a reactive routing computer network in accordance with one or more embodiments described herein, for example, for a limited searching technique. The procedure 500 starts at step 505, and continues to step 510, where the reactive routing network 100 is logically partitioned into two or more diverse logical topologies, for instance, a priori (configured on the nodes 101) or through an algorithm carried in RREQ messages 300 (e.g., as determined by the source node S). In step 515, the source node (wishing to determine disjoint paths/routes) may transmit RREQ messages 300 toward the destination node (e.g., D) on each logical topology. For example, the RREQ messages may have an indication of the corresponding logical topology (field 320, either explicit or the algorithm used to determine it), as described above, as well as an indication that the RREQ messages should be transmitted all the way to destination node (e.g., field 314). Each receiving intermediate node 101 may process the RREQ messages in step 520 based on the indication of its corresponding logical topology, such as by discarding the message, determining where to send the message, etc., as mentioned above. Also, the destination node D may process the RREQ messages in step 520 based on the indication of its corresponding logical topology, such as by preparing one or more RREP messages 300, also as mentioned above.

In step 525, the source node may receive one or more RREP messages 300, each indicating a route (field 330) to reach the destination node using each corresponding logical topology (field 320). If the source node does not receive two or more diverse routes in step 530, then as described above, a first option ("A") is to logically partition the network into a comparatively smaller number of diverse logical topologies in step 535, such as reducing the number from three down to two (e.g., from FIG. 4A to FIG. 4B). Alternatively or in addition (e.g., after having already reduced the topologies to two without results), a second option ("B", step 540) is to go to procedure 600 of FIG. 6 below, e.g., reducing the number of topologies to one. If, on the other hand, the source node does receive two or more diverse routes in step 530, then the source node may select a route for each logical topology to reach the destination node in step 545 based on the received RREP messages, and may subsequently transmit traffic in step 550 from the source node to the destination node over the selected two or more (diverse/disjoint) routes. The procedure 500 ends in step 555.

Figure 6:
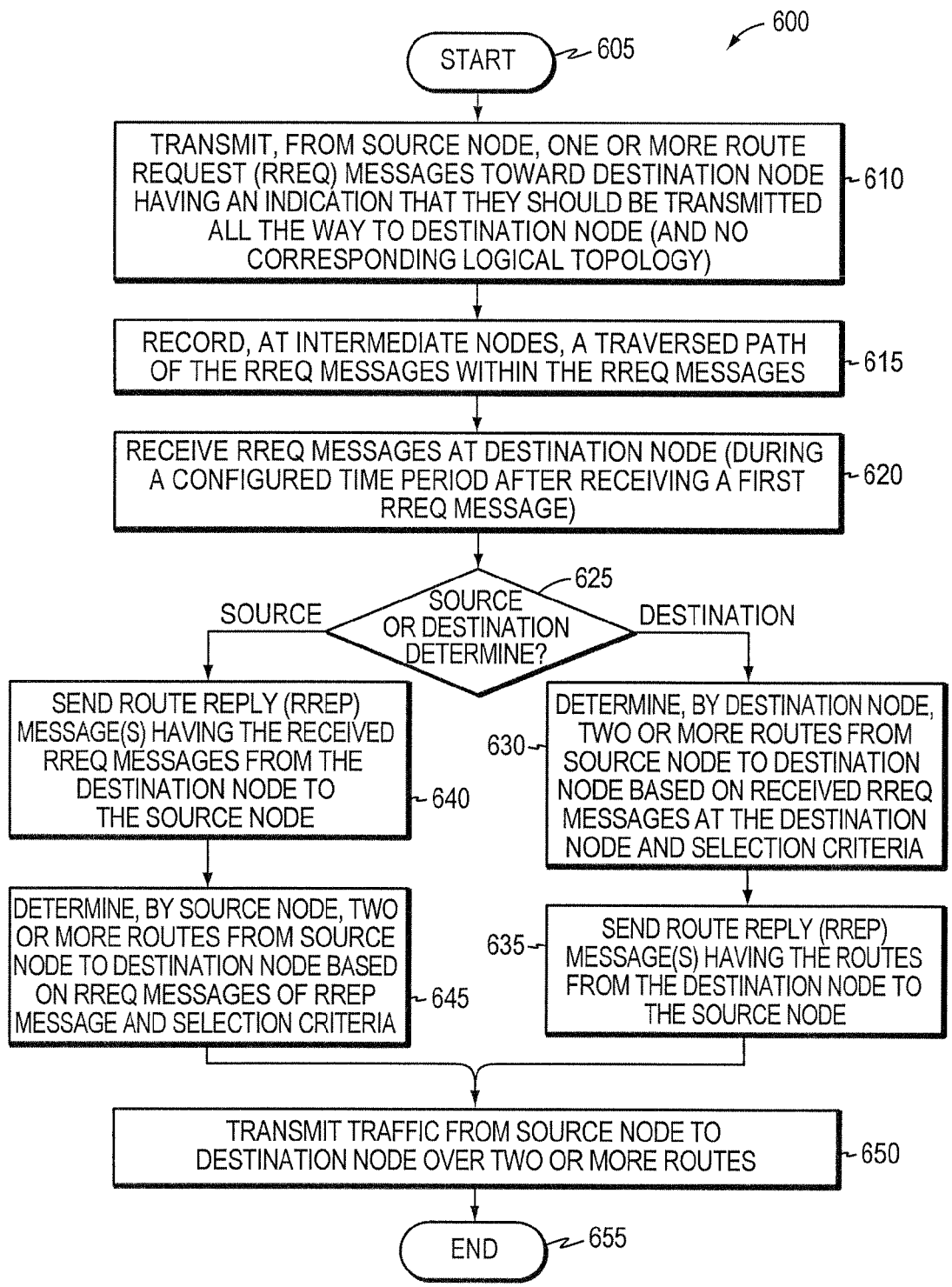

FIG. 6 illustrates another example procedure for computing disjoint paths in a reactive routing computer network in accordance with one or more embodiments described herein, for example, for a complete searching technique. The procedure 600 starts at step 605, notably in response to step 540 of FIG. 5 above, or as a separate, standalone procedure for computing disjoint paths. The procedure 600 continues to step 610, where the source node S may transmit one or more RREQ messages 300 toward destination node D, the RREQ messages having an indication that they should be transmitted all the way to destination node (and, as opposed to procedure 500 above, need no corresponding logical topology). Each intermediate node 101 processes the RREQ by recording the traversed path (field 330) in step 615, and in step 620, the destination node may eventually begin receiving the RREQ messages. For instance, a first RREQ message 300 may be received at the destination node, and then for a configured time period (timer 243), may wait to receive additional RREQ messages in order to proceed with the following steps.

In particular, if in step 625 the destination node is configured to determine/compute the disjoint paths, then in step 630 the destination node accordingly determines two or more routes from source node to destination node based on the received RREQ messages and various selection criteria, as described above. The destination node may then send an RREP message 300 in step 635 to the source node having the determined diverse/disjoint routes. Conversely, if in step 625 the source node is configured to determine/compute the disjoint paths, then in step 640 the destination node sends RREP message(s) 300 to the source node having the received RREQ messages, such as in a separate message for each received RREQ message, or in a single RREP message containing all paths from received RREQ messages (e.g., in field 340). The source node may then determine, in step 645, the two or more routes from source node to destination node based on the RREQ messages of the RREP message(s) and selection criteria, also as described above. The source node may then transmit traffic in step 650 from the source node to the destination node over the selected two or more (diverse/disjoint) routes, and the procedure 600 ends in step 655.

Advantageously, the novel techniques described herein compute disjoint paths in a reactive routing computer network. In particular, the novel techniques build disjoint source routed paths in a reactive routing network (e.g., a MANET) using either a limited search along a set of disjoint (partitioned) logical topologies, or a complete search with path computation among a set of path candidates received at a destination node, or both. In this manner, the specified set of techniques may be used to load balance traffic or duplicate traffic along diverse paths in a reactive routing mesh network, thus greatly enhancing convergence time as compared to a classical recovery approach. Further, the dynamic aspects of one or more embodiments described herein alleviate the need for cumbersome and inefficient manual configuration.

While there have been shown and described illustrative embodiments that compute disjoint paths in a reactive routing computer network, it is to be understood that various other adaptations and modifications may be made within the spirit and scope of the present invention. For example, the embodiments have been shown and described herein using various protocols (e.g., MANET-based) and messages. However, the embodiments of the invention in their broader sense are not so limited, and may, in fact, be used with other protocols (e.g., proprietary and/or public) and messages, accordingly.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method, comprising:
transmitting, by a source node, a first route request (RREQ) message toward a destination node of a reactive routing computer network, the first RREQ message having an indication that the first RREQ message is to be transmitted all the way to the destination node, wherein one or more intermediate nodes traversed by the first RREQ message record a traversed path of the first RREQ message within the first RREQ message;
transmitting, by the source node, a second RREQ message toward the destination node, the second RREQ message having an indication that the second RREQ message is to be transmitted all the way to the destination node, wherein one or more intermediate nodes traversed by the second RREQ message record a traversed path of the second RREQ message within the second RREQ message;
receiving, by the source node, a route reply (RREP) message from the destination node, the RREP message including at least the first RREQ message and the second RREQ message; and
determining, by the source node, based on at least the first RREQ message and the second RREQ message included in the RREP message, at least a first route and a second route from the source node to the destination node, wherein the first route and the second route are determined based on the traversed path recorded within the first RREQ message and the traversed path recorded within the second RREQ message.

2. The method of claim 1, further comprising:
after receiving the RREP message, transmitting a data packet to the destination node via the first route.

3. The method of claim 1, wherein the RREP message is transmitted by the destination node to the source node after the destination node received both the first RREQ message and the second RREQ message.

4. The method of claim 3, wherein the destination node received both the first RREQ message and the second RREQ message within a predetermined time period.

5. The method of claim 1, wherein the traversed path of the first RREQ message is different than the traversed path of the second RREQ message.

6. The method of claim 1, wherein the first RREQ message is transmitted to the destination node via a first logical topology of the reactive routing computer network and the second RREQ message is transmitted to the destination node via a second logical topology of the reactive routing computer network.

7. The method of claim 6, further comprising:
partitioning the reactive routing computer network into at least the first logical topology and the second logical topology.

8. A source node, comprising:
one or more computer processors; and
a memory storing instructions that, when executed by the one or more computer processors, cause the source node to:
transmit a first route request (RREQ) message toward a destination node of a reactive routing computer network, the first RREQ message having an indication that the first RREQ message is to be transmitted all the way to the destination node, wherein one or more intermediate nodes traversed by the first RREQ message record a traversed path of the first RREQ message within the first RREQ message;
transmit a second RREQ message toward the destination node, the second RREQ message having an indication that the second RREQ message is to be transmitted all the way to the destination node, wherein one or more intermediate nodes traversed by the second RREQ message record a traversed path of the second RREQ message within the second RREQ message;
receive a route reply (RREP) message from the destination node, the RREP message including at least the first RREQ message and the second RREQ message; and
determine, based on at least the first RREQ message and the second RREQ message included in the RREP message, at least a first route and a second route from the source node to the destination node, wherein the first route and the second route are determined based on the traversed path recorded within the first RREQ message and the traversed path recorded within the second RREQ message.

9. The source node of claim 8, wherein the instructions further cause the source node to:
after receiving the RREP message, transmit a data packet to the destination node via the first route.

10. The source node of claim 8, wherein the RREP message is transmitted by the destination node to the source node after the destination node received both the first RREQ message and the second RREQ message.

11. The source node of claim 10, wherein the destination node received both the first RREQ message and the second RREQ message within a predetermined time period.

12. The source node of claim 8, wherein the traversed path of the first RREQ message is different than the traversed path of the second RREO message.

13. The source node of claim 8, wherein the first RREQ message is transmitted to the destination node via a first logical topology of the reactive routing computer network and the second RREQ message is transmitted to the destination node via a second logical topology of the reactive routing computer network.

14. The source node of claim 13, wherein the instructions further cause the source node to:
partition the reactive routing computer network into at least the first logical topology and the second logical topology.

15. A non-transitory computer-readable medium storing instructions that, when executed by a source node, cause the source node to:
transmit a first route request (RREQ) message toward a destination node of a reactive routing computer network, the first RREQ message having an indication that the first RREQ message is to be transmitted all the way to the destination node, wherein one or more intermediate nodes traversed by the first RREQ message record a traversed path of the first RREQ message within the first RREQ message;
transmit a second RREQ message toward the destination node, the second RREQ message having an indication that the second RREQ message is to be transmitted all the way to the destination node, wherein one or more intermediate nodes traversed by the second RREQ message record a traversed path of the second RREQ message within the second RREQ message;

receive a route reply (RREP) message from the destination node, the RREP message including at least the first RREQ message and the second RREQ message; and determine, based on at least the first RREQ message and the second RREQ message included in the RREP message, at least a first route and a second route from the source node to the destination node, wherein the first route and the second route are determined based on the traversed path recorded within the first RREQ message and the traversed path recorded within the second RREQ message.

16. The non-transitory computer-readable medium of claim 15, wherein the instructions further cause the source node to:

after receiving the RREP message, transmit a data packet to the destination node via the first route.

17. The non-transitory computer-readable medium of claim 15, wherein the RREP message is transmitted by the destination node to the source node after the destination node received both the first RREQ message and the second RREQ message.

18. The non-transitory computer-readable medium of claim 17, wherein the destination node received both the first RREQ message and the second RREQ message within a predetermined time period.

19. The non-transitory computer-readable medium of claim 15, wherein the traversed path of the first RREQ message is different than the traversed path of the second RREQ message.

20. The non-transitory computer-readable medium of claim 15, wherein the first RREQ message is transmitted to the destination node via a first logical topology of the reactive routing computer network and the second RREQ message is transmitted to the destination node via a second logical topology of the reactive routing computer network.

* * * * *